(12) United States Patent
Delaney et al.

(10) Patent No.: US 12,030,229 B2
(45) Date of Patent: Jul. 9, 2024

(54) HYBRID STRUCTURE AND METHOD FOR MANUFACTURING

(71) Applicant: SABIC GLOBAL TECHNOLOGIES B.V., Bergen op Zoom (NL)

(72) Inventors: Matthew Michael Delaney, Wixom, MI (US); Gregory E. Tremblay, Houston, TX (US); Dinesh Munjurulimana, Bangalore (IN); Rajkumar Karthikeyan, Bangalore (IN); Anil Tiwari, Bangalore (IN); Dhanendra Kumar Nagwanshi, Wixom, MI (US); Arunachala Parameshwara, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 18/136,611

(22) Filed: Apr. 19, 2023

(65) Prior Publication Data
US 2023/0249385 A1   Aug. 10, 2023

Related U.S. Application Data

(63) Continuation of application No. 16/603,267, filed as application No. PCT/IB2018/052414 on Apr. 6, 2018, now Pat. No. 11,660,792.
(Continued)

(51) Int. Cl.
*B62D 25/04* (2006.01)
*B29C 45/14* (2006.01)
(Continued)

(52) U.S. Cl.
CPC .. *B29C 45/14344* (2013.01); *B29C 45/14336* (2013.01); *B62D 25/04* (2013.01);
(Continued)

(58) Field of Classification Search
CPC ............................. B62D 29/004; B62D 25/04; B29C 45/14344; B29C 45/14336; B29C 2045/14327; B29L 2031/3002
See application file for complete search history.

(56) References Cited

U.S. PATENT DOCUMENTS

| 6,378,268 B1 | 4/2002 | Guyomard |
| 6,421,979 B1 | 7/2002 | Fischer et al. |

(Continued)

FOREIGN PATENT DOCUMENTS

| CA | 2394790 A1 | 5/2001 |
| CN | 102481954 A | 5/2012 |

(Continued)

OTHER PUBLICATIONS

Grujicic et al. "Investigation of a polymer metal inter-locking technology for use in load-bearing automotive components" Multidiscipline Modeling in Materials and Structures, vol. 6. No. 1, 2010, pp. 23-44.
(Continued)

*Primary Examiner* — Gregory A Blankenship
(74) *Attorney, Agent, or Firm* — CANTOR COLBURN LLP

(57) ABSTRACT

The invention relates to a hybrid structure comprising a first component having a base and an upstanding wall extending from the base, the first component having an interior enclosed between the upstanding wall and the base, and a thermoplastic second component moulded to the first component, the second component comprising a reinforcing portion for structurally reinforcing the first component, the reinforcing portion extending in a longitudinal direction of the first component and located in the interior of the first component, the thermoplastic second component further comprising a locking portion that extends adjacently over at least part of an exterior of the first component, wherein the
(Continued)

reinforcing portion and the locking portion are integrally formed, thus interlocking the first component in the thermoplastic second component. The invention relates as well to a method for manufacturing such a hybrid structure, and to a vehicle comprising such a hybrid structure.

19 Claims, 7 Drawing Sheets

Related U.S. Application Data

(60) Provisional application No. 62/483,560, filed on Apr. 10, 2017.

(51) Int. Cl.
    *B62D 29/00* (2006.01)
    *B29L 31/30* (2006.01)

(52) U.S. Cl.
    CPC .. *B62D 29/004* (2013.01); *B29C 2045/14327* (2013.01); *B29L 2031/3002* (2013.01)

(56) References Cited

U.S. PATENT DOCUMENTS

| | | | |
|---|---|---|---|
| 10,583,629 B2 | 3/2020 | Imamura et al. | |
| 11,660,792 B2* | 5/2023 | Delaney | B29C 45/14344 296/146.5 |
| 11,787,272 B2* | 10/2023 | Grond-Soons | B62D 29/043 49/503 |
| 2001/0025462 A1 | 10/2001 | Laurent | |
| 2003/0008105 A1 | 1/2003 | Haack et al. | |
| 2004/0232591 A1 | 11/2004 | Dajek et al. | |
| 2005/0040672 A1 | 2/2005 | Andre | |
| 2005/0229530 A1 | 10/2005 | Schmidt et al. | |
| 2006/0147672 A1 | 7/2006 | Ruiz | |
| 2007/0134452 A1 | 6/2007 | Merkle et al. | |
| 2007/0262617 A1 | 11/2007 | Feith et al. | |
| 2008/0036235 A1 | 2/2008 | Ameloot et al. | |
| 2008/0116701 A1 | 5/2008 | Boumaza et al. | |
| 2008/0138586 A1 | 6/2008 | Mooijman et al. | |
| 2008/0317988 A1 | 12/2008 | Mooijman et al. | |
| 2011/0236610 A1 | 9/2011 | Belpaire | |
| 2014/0203592 A1 | 7/2014 | Nagwanshi et al. | |
| 2015/0197289 A1 | 7/2015 | Kurokawa | |
| 2016/0257348 A1 | 9/2016 | Balur et al. | |
| 2017/0008206 A1 | 1/2017 | Schoenhammer et al. | |
| 2018/0001525 A1 | 1/2018 | Imamura et al. | |
| 2018/0290523 A1 | 10/2018 | Imbert et al. | |
| 2019/0382056 A1 | 10/2019 | Shantz | |
| 2019/0344836 A1 | 11/2019 | Kushalappa et al. | |
| 2020/0307708 A1 | 10/2020 | Beil et al. | |
| 2020/0385062 A1 | 12/2020 | Telukunta et al. | |
| 2021/0078224 A1 | 3/2021 | Delaney et al. | |
| 2021/0178644 A1 | 6/2021 | Koyama et al. | |
| 2022/0185392 A1 | 6/2022 | Torigaki et al. | |
| 2023/0278636 A1* | 9/2023 | Munjurulimana | B62D 21/152 296/187.1 |

FOREIGN PATENT DOCUMENTS

| | | |
|---|---|---|
| DE | 102010014503 A1 | 10/2011 |
| WO | 2016125552 A1 | 8/2016 |

OTHER PUBLICATIONS

International Preliminary Report on Patentability; International Application No. PCT/IB2018/052414; International Filing Date: Apr. 6, 2018; 7 pages.
International Search Report; International Application No. PCT/IB2018/052414; International Filing Date: Apr. 6, 2018; Date of Mailing: Jul. 5, 2018; 5 pages.
Written Opinion; International Application No. PCT/IB2018/052414; International Filing Date: Apr. 6, 2018; Date of Mailing: Jul. 5, 2018; 8 pages.
Zoellner et al. "Plastic-Metal Hybrid—a New Development in the Injection Molding Technology", ANTEC, 2002, pp. 1-4.

* cited by examiner

Fig. 5
Fig. 6
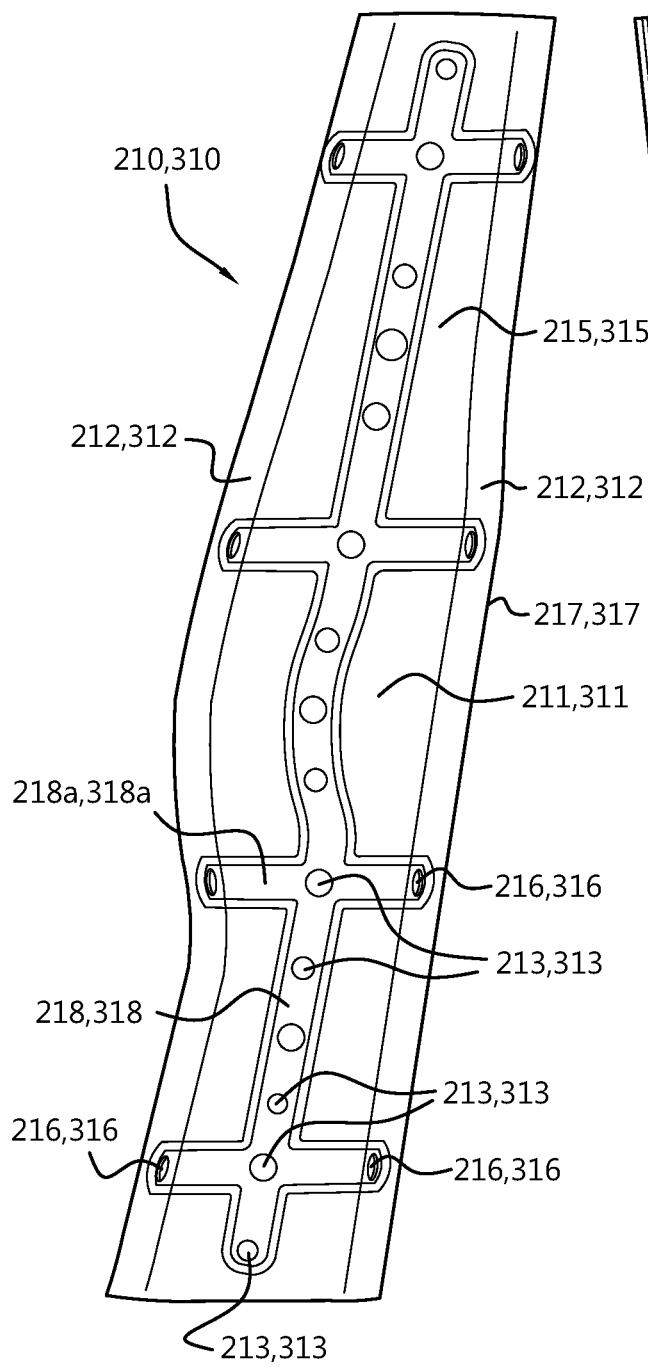
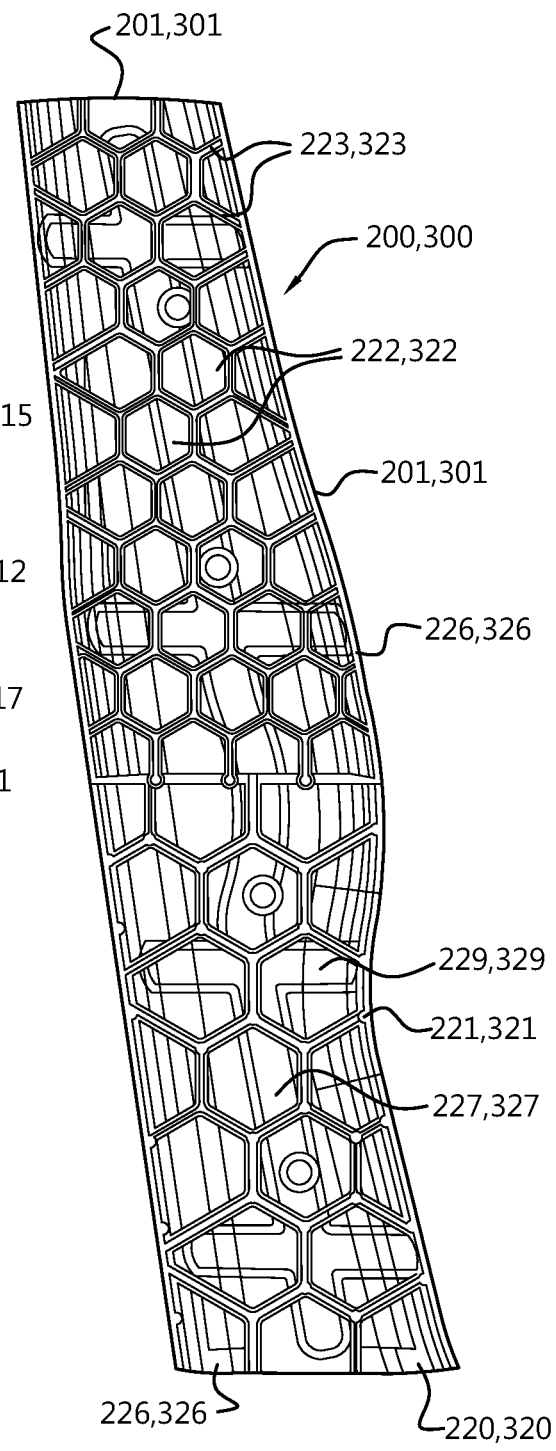

HYBRID STRUCTURE AND METHOD FOR MANUFACTURING

CROSS REFERENCE TO RELATED APPLICATIONS

This application is a is a continuation application of application Ser. No. 16/603,267, filed Oct. 7, 2019, which is a National Stage application of PCT/IB2018/052414 filed Apr. 6, 2018, which claims the benefit of U.S. Application Ser. No. 62/483,560, filed Apr. 10, 2017, all of which are incorporated herein by reference in their entirety.

BACKGROUND OF THE INVENTION

Field of the Invention

The present invention relates to a hybrid structure, specifically a hybrid reinforcing member for reinforcing a part of a body frame of a vehicle. Furthermore, the invention relates to a method for manufacturing such a hybrid structure. Moreover, the invention relates to a vehicle comprising such a hybrid structure.

Description of the Related Art

Engineered systems in today's automobiles are often designed and built to meet conflicting and complex requirements. While mobility is a car's primary function, accomplishing that in an energy-efficient manner and ensuring the safety of the occupants are critical requirements. Automotive OEMs, therefore, are aggressively working on making vehicles lighter without compromising its safety. Meeting such complex requirements often requires solutions encompassing innovative designs, manufacturing processes and multi-material systems.

Hybrid systems or structures combining various different materials, are therefore being increasingly used across the automotive industry as they are more than once significantly lighter than single material systems and show very good properties with regard to safety. Moreover, hybrid structures are known to offer significant cost advantage through part integration and reduced cycle time. Typically, in a metal-plastic or composite-plastic hybrid system, there is a metal or composite structure running throughout the major load carrying path, and a secondary plastic structure is joined with the metal or composite structure to improve the local stiffness of the assembly. In general, hybrid systems help to reduce the weight up to 50% compared to single material systems, while maintaining the desired performance.

For example, American patent publication US 2008/0138586 discloses the interlocking of a profile member with a reinforcement member by means of forcing polymer material into a wall hem or an opening between two wall hems. The wall hems act as flow leaders as well as runner channels, carrying the melt throughout the profile member. During injection moulding, plastic fills the channels creating a mechanical, interlocking connection between both materials, forming a hybrid structure.

The use of dissimilar materials in one system necessitates a bond between two different materials, which can be a challenge in itself to overcome. Several bonding techniques have been employed, such as a mechanical connection between the metal of composite structure and the secondary structure, or chemical and/or laser treatment of the metal or composite structure before moulding the secondary plastic structure on its surface. Use of adhesives is yet another method used across the industry to improve the bonding between different materials.

In light of the above, it would be desirable to provide a hybrid component with a connection between dissimilar material that alleviated at least some of the perceived inconveniences of the prior art.

BRIEF SUMMARY OF THE INVENTION

According to the invention, there is provided a hybrid structure comprising: a first component having a base and an upstanding wall extending from the base, the first component having an interior enclosed between the upstanding wall and the base, and a thermoplastic second component moulded to the first component, the second component comprising a reinforcing portion for structurally reinforcement of the first component, the reinforcing portion extending in a longitudinal direction of the first component and located in the interior of the first component, the thermoplastic second component further comprising a locking portion that extends adjacently over at least part of an exterior of the first component, wherein the reinforcing portion and the locking portion are integrally formed, thus interlocking the first component in the thermoplastic second component.

Establishing a connection between two components of dissimilar materials, which connection can withstand the mechanical performance requirements for the automotive industry, or any other industry where safety is of importance, is a challenge. The hybrid structure as described herein provides a cost effective solution to join dissimilar materials by creating a mechanical lock through (partially) encapsulating a pre-formed first component within a thermoplastic second component.

The thermoplastic second component locks to the first component by enveloping the first component between the reinforcing portion in the first component and the locking portion that is adjacent to an exterior of the first component and is connected to the reinforcing portion. This locking of the first component can be done by a full enveloping, i.e. the first component is fully encapsulated within the second component, or can be a partial enveloping, i.e., parts of the first component are not covered by, or are free from, the second component. By locking the first component within the second component, a mechanical bond is created between the first component and the second component without the use of an adhesive. The hybrid structure may form a single, unified member with good structural integrity. The hybrid structure allows to obtain complex geometries which otherwise could have been difficult to achieve using only metals or composites.

According to an embodiment, the first component comprises at least one through hole, and the locking portion connects to the reinforcing portion through the through hole. The through hole may be located in the base and/or the upstanding wall of the first component.

For additional fixation of the second component with respect to the first component, the first component may be provided with at least one through hole extending from the exterior of the first component to an interior of the first component. The locking portion of the second component extends over and in the through hole. The part of the locking portion extending in the through hole may be connected to or formed integrally with the reinforcing portion of the second component.

The first component may have at least two opposite upstanding walls extending from the base, such that the interior of the first component forms a channel. The reinforcing portion can then be located in the channel. The reinforcing portion may extend between opposite sides of the channel.

The reinforcing portion may extend towards and may be adjacent to the base of the first component, thereby filling the space enclosed by the base and the upstanding wall or walls of the first component. Preferably, the reinforcing portion comprises an open structure, for instance an alveolar structure comprising channels directed transverse to the base of the first component. The hybrid structure can have an alveolar structure more commonly referred to as "honeycomb" (e.g., an array of columns and channels). The combs of the structure can be any polygonal or rounded shape, such as circular, oval, square, rectangular, triangular, diamond, pentagonal, hexagonal, heptagonal, and octagonal geometries, as well as combinations comprising at least one of the foregoing geometries. Plastic honeycombs can be made by moulding the plastic honeycombs into the first component.

In the case that the first component has at least two opposite upstanding walls having end edges, the reinforcing portion may extend from one end edge to an opposite end edge of the first component. Preferably, the locking portion extends over the exterior of the first component from the one end edge to the opposite end edge of the first component, thus connecting with the reinforcing portion at the end edges of the first component.

The locking portion may be formed as a ribbon shaped locking member. The locking portion can extend in a ribbon like form over the exterior of the first component, thus partially covering the exterior of the first component. Preferably the ribbon locking member can extend from one side of the second component over the exterior of the first component to an opposite side of the second component, thus partially covering the exterior of the first component. Preferably, two or more ribbon locking members extend over the first component, possibly at a distance different from zero from each other. Preferably the ribbon locking members cover less than 75 percent (or less than 50 percent, e.g., less than 30 percent) of the exterior of the first component.

Alternatively or additionally, when the first component has at least two opposite upstanding walls having end edges, the locking portion may comprise a frame moulded on the end edges of the first component partially covering the exterior of the first component, thereby surrounding and enveloping the end edges of the first component.

The frame of the locking portion may be integrally formed with the reinforcing portion. Thus, the locking portion can extend over (part of) the exterior of the first component as a frame and/or through a through hole in the first component and/or from one end edge to an opposite end edge of the first component, or combinations thereof.

According to a further embodiment, the base and/or the upstanding wall comprises a corrugation extending in the longitudinal direction of the first component at its exterior. Preferably, the locking portion adjacent to the exterior of the first component extends with the corrugation in the longitudinal direction. The corrugation can be a deepening or a raised portion with respect to the base and/or upstanding wall of the first component.

The locking portion can extend along part of the corrugation, either continuously or intermittently. The corrugation can have a length shorter or equal to the length of the first component. The corrugation can comprise parts that branch off at an angle different from 0 or 180 degrees with the longitudinal corrugation, such that corrugation branches are formed. Preferably, the locking portion extends over or in the corrugation branches as well.

The base of the first component can have a plurality of through holes through, which the locking portion extends to the exterior of the first component. It is preferred that the through holes provided in the base are located at or in the corrugation and that for each corrugation branch at least one through hole is provided such that the locking portion can connect with the reinforcing portion in the first component at various locations along the corrugation, thereby strengthening the mechanical interlocking between the first and second components.

Additionally or alternatively, the base and/or upstanding wall may comprise a corrugation at the interior of the first component, wherein the second component extends with the corrugation in the longitudinal direction. The corrugation can be a deepening or a raised portion with respect to the base and/or the upstanding wall of the first component.

The corrugation at the interior of the first component may form a flow leader of thermoplastic material when moulding the second component onto the first component. This is especially of advantage when the reinforcing portion has an alveolar structure and the flow leader can lead the flow of thermoplastic material into a mould for the alveolar structure in a relatively faster and more efficient way.

The base of the first component can have an off-set portion, i.e. a corrugation, that forms either a deepening at the exterior of the first component and a raised portion at the interior of the first component, or a raised portion at the exterior of the first component and a deepening at the interior of the first component. It is preferred that the corrugation in the base at the interior of the first component is the negative of the corrugation at the exterior of base of the first component.

Alternatively, or additionally, a corrugation is provided in the upstanding wall of the first component, the corrugation extending in a longitudinal direction of the first component. Such corrugation would provide additional strength to the first component.

According to a further embodiment, the first component may be a composite component, a metallic component, or a composite/metal hybrid component. Furthermore, the first component may be made of a thermoset material or a thermoplastic material, wherein the thermoplastic material of the first component has a higher heat stability and/or a higher flow temperature compared to the thermoplastic material of the second component.

Some possible metal component material(s) include aluminum, titanium, chrome, magnesium, zinc, and steel, as well as combinations or alloys comprising at least one of the foregoing materials. The thickness of the walls of the metal component can be continuous for all walls or can vary along the first component to enhance stiffness in a desired direction. For example, one of the opposing walls can have a greater/lesser thickness than the other of the opposing walls. In some embodiments, the metal component has a wall thickness of less than or equal to 1.6 millimeter (mm), specifically, 1.0 mm to 1.5 mm, and more specifically 1.3 mm to 1.4 mm. Generally, the walls of the metal component have a wall thickness of greater than 1.8 mm for full metal structures. Therefore, the use of the plastic reinforcement enables a reduction in wall thickness of greater than or equal to 10%, specifically, greater than or equal to 20%, and even greater than or equal to 25%.

Possible composite materials are a combination of a plastic matrix material, being either a thermoplastic material or a thermoset material, and a reinforcing filling material. Examples of such filling material can be fibers, long fibers or continuous fibers, a non-woven or a woven textile of continuous fibers. The composite material can comprise at least one of glass, carbon and aramid fiber, respectively. Other possibilities are the less commonly used metal fibers, such as boron-tungsten fibers and silicon carbide coated fibers, or ceramic fibers, such as quartz, silica or alumina fibers. Examples of a thermoset material can be a polyester resin, a polyurethane, epoxy resin, polyimide or a silicone resin, and the like.

Possible thermoplastic materials include polybutylene terephthalate (PBT); acrylonitrile-butadiene-styrene (ABS); polycarbonate; polycarbonate/PET blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). For example, the thermoplastic second component can comprise Xenoy™ resin, which is commercially available from SABIC. The plastic can optionally be reinforced, e.g., with fibers, particles, flakes, as well as combinations comprising at least one of the foregoing. For example, the thermoplastic second component can be formed from STAMAX™ materials, a long glass fiber reinforced polypropylene commercially available from SABIC. The thermoplastic second component can also be made from combinations comprising at least one of any of the above-described materials and/or reinforcements.

Furthermore, the characteristics of the second component will depend upon the energy absorption characteristics desired in the particular area, for example the number of combs per unit area, the thickness of the comb walls, and the specific material of the reinforcing portion. The density of combs (number of combs per unit area) is dependent upon the desired stiffness and materials employed. In some embodiments, the density can be 1 to 20 combs per 100 millimeters squared ($mm^2$), specifically, 1 to 10 combs per 100 $mm^2$, and more specifically 1 to 5 combs per 100 $mm^2$. In various embodiments, the thickness of the walls of the reinforcing portion can be 0.5 mm to 10 mm, specifically, 2 mm to 5 mm, and more specifically 2.5 mm to 4 mm.

The second component can have a length commensurate with the length of the first component or less than the length of the first component (e.g., can be localized; i.e., disposed only in a specific location to attain enhanced structural integrity of that location). Desirably, to maximize the weight reduction, the second component is localized to add the minimum amount of weight needed to attain a desired structural integrity (e.g., a structural integrity that this greater than or equal to the standard metal component without the thinner walls). In various embodiments, the length of the second component can be less than or equal to 80% of the length of the first component, specifically, less than or equal to 60%, more specifically, less than or equal to 50%, and yet more specifically, 10% to 35% of the length of the first component.

Preferably, the hybrid structure is a reinforcing member for a body frame of a vehicle. In order to be able to connect the hybrid structure as a stiffening or reinforcing part to a body frame of a vehicle, the exterior of the first component may comprise connecting areas free of the second component, such that the hybrid structure is connectable to the body frame of the vehicle. As such, the hybrid structure may be left unmoulded at selective locations that are further on used to join the member with the body frame. Preferably, the hybrid structure is connectable to the body frame of the vehicle by means of at least one of a mechanical fastener, a weld and an adhesive or any similar joining methods.

The invention relates as well to a vehicle comprising a hybrid structure as described above. The hybrid structure may be configured for stiffening a part of a body frame of a vehicle, for instance a body-in-white frame for a motorized vehicle, such as a car. Furthermore, the hybrid structure may be a reinforcement member for or being a part of one of an A-pillar, a B-pillar, a C-pillar, a D-pillar region, and a roof pillar of a body frame of the vehicle. Alternatively, the hybrid structure may be used to form a full body in white or structural body frame of the vehicle. Other applications of the hybrid structure in vehicles could be for a tailgate, a seat frame, a bumper beam or other energy absorbing component, a front end module, a battery carrier, a cross car beam and any other structural vehicle component for which a hybrid structure as described herein would be beneficial and/or suitable.

Various weight reduction opportunities by either replacing the existing metal reinforcements in the body in white frame or by replacing a complete sub-system such as the B-pillar can be obtained using the hybrid structure. For example, a combination of high heat unfilled thermoplastic resins (tough and ductile) or fiber reinforced thermoplastic resin (high stiffness and strength) with metal is chosen appropriately depending on the requirements. For instance, an unfilled thermoplastic resin overmoulded with multiple metallic inserts may be used to replace the incumbent energy-absorbing members in the floor rocker for side impact, and fiber compounded thermoplastic resin overmoulded with a metallic insert is chosen to replace the existing B-pillar with comparable crash performance. The hybrid structure designed as a B-pillar may replace a multi-piece B-pillar made of high-strength steel. The metal insert or component in the hybrid structure can be exploited for assembly ease in the body in white structure. Such a solution not only offers part integration possibilities with equivalent crash performance as that of a generic vehicle, but also opens the door for replacing the high-strength steel used nowadays in the body in white frame with a medium-strength steel, thereby reducing manufacturing costs.

According to an embodiment, the hybrid structure forms part of the structural body frame. As such, the first component may be a hollow structural vehicle component of the structural body frame of the vehicle. Preferably, the hybrid structure forms at least part of one of an A-pillar, a B-pillar, a C-pillar, a D-pillar region, and a roof pillar of a body-in-white frame of the vehicle.

The invention further relates to a method for manufacturing the hybrid structure as described above, the method comprising: providing the first component; providing the thermoplastic second component to the first component by moulding the reinforcing portion in the interior of the first component, and moulding the locking portion onto the exterior of the first component to cover at least part of the exterior, wherein the reinforcing portion and the locking portion are integrally moulded, thus interlocking the second component and the first component.

For the method, a tooling or a mould or a cast having a cavity and a core may be used. The first component may be provided in the cavity, and the core is inserted in the interior of the first component. The cavity and the core may be shaped to allow thermoplastic material to flow within the interior of the first component to form the reinforcement portion and flow over the exterior of the first component to form the locking portion. The first component is thus overmoulded with thermoplastic material to form the thermoplastic second component.

This may be accomplished through insert injection moulding of the thermoplastic material into an injection moulding tool allowing the flowable (molten) thermoplastic material to flow around the first component and solidifying the thermoplastic material to form the second component and to create the physical bond between the first component and the second component. The overmoulding and/or insert moulding may comprise one of injection moulding or injection compression moulding.

According to an embodiment of the method, the base and/or the upstanding wall of the first component has at least one through hole, and the method further comprises moulding the second component through the through hole to form the reinforcing portion or the locking portion.

The through hole can be provided in the base and/or the upstanding wall, and allows thermoplastic material to flow between the interior and exterior of the first component. Upon solidification of the thermoplastic material, the material in the through hole connects the reinforcing portion at the interior of the first component and the locking portion at the exterior of the first component.

Alternatively or additionally, the first component may have at least two opposite upstanding walls having end edges, the method further comprising moulding the reinforcing portion in the interior from one end edge to an opposite end edge of the first component, and moulding the locking portion over the exterior of the first component from the one end edge to the opposite end edge of the first component, thus connecting the locking portion with the reinforcing portion at the end edges of the first component.

In the case that the first component has at least two opposite upstanding walls having end edges, the method may alternatively or additionally comprising moulding a frame on the end edges of the first component to partially cover the exterior of the first component, thereby surrounding and enveloping the end edges of the first component.

BRIEF DESCRIPTION OF THE DRAWINGS

The features and advantages of the invention will be further appreciated upon reference to the following drawings of a number of exemplary embodiments, in which:

FIG. 5 shows a top view of the exterior of the first component of the hybrid structures of FIGS. 3 and 4;

FIG. 6 shows a bottom view of the interior of the hybrid structure of FIGS. 3 and 4;

DESCRIPTION OF ILLUSTRATIVE EMBODIMENTS

Figure 1A:
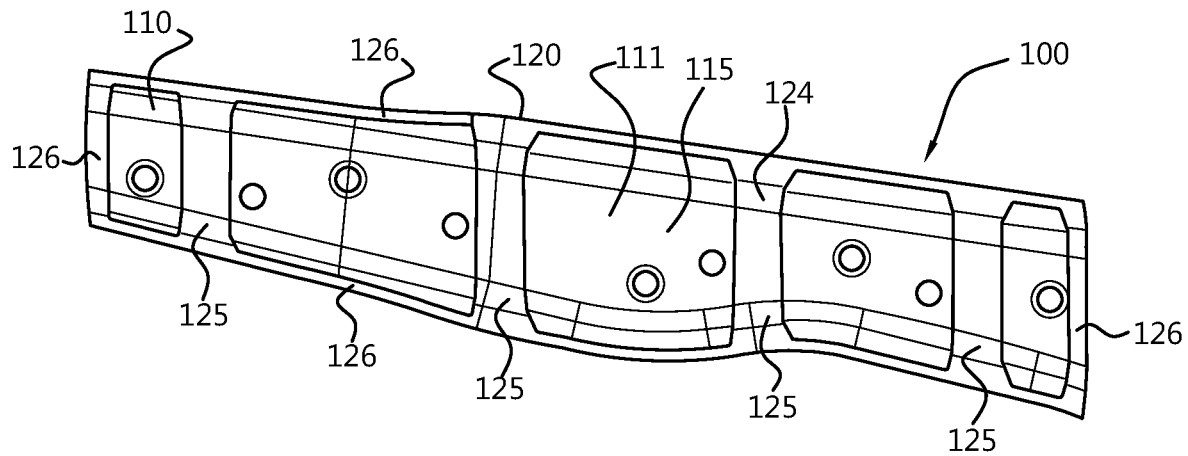
FIGS. 1a-c show a hybrid structure according to an embodiment of the present invention in various views.
Figure 2A:
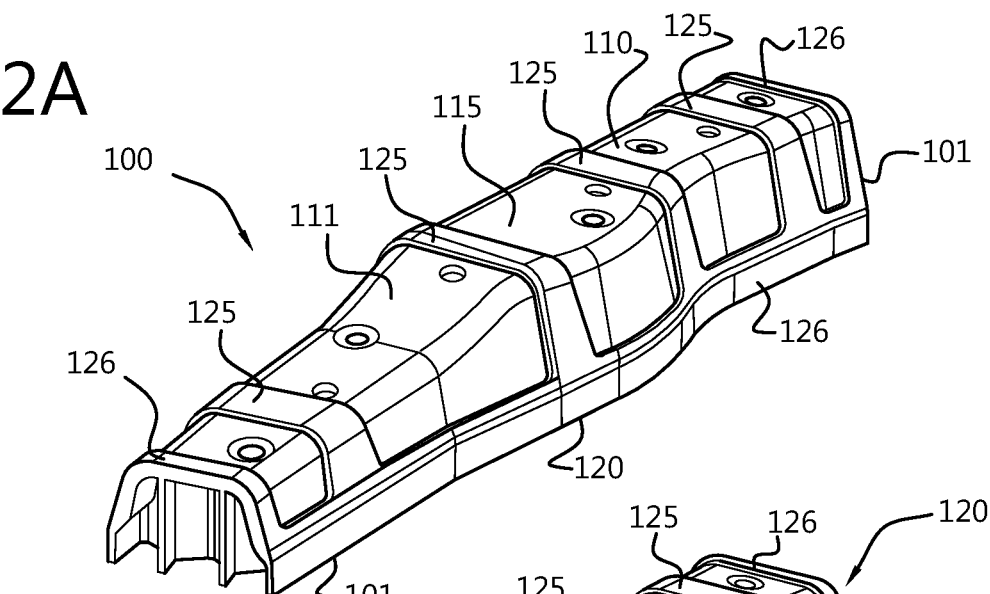
FIGS. 2a-c show the separate components of the hybrid structure of FIGS. 1a-c.

FIG. 1a shows a top view of an embodiment of a hybrid structure 100 according to the present invention. The hybrid structure 100 comprises a first component 110 and a thermoplastic second component 120. The first component has a base 111 and two opposite upstanding walls 112 extending from the base 111 (see also FIG. 2c). The base 111 has a plurality of through holes 113 (see FIG. 2c). The upstanding walls 112 have a plurality of further through holes 116, which are aligned with the through holes 113 of the base 111. The first component has an interior 114 that is formed as a channel.

The second component 120 is made of a thermoplastic material moulded to the first component 110. The second component 120 has a reinforcing portion 121 that structurally reinforces the first component 120. The reinforcing portion 121 is located in the channel shaped interior and extends in a longitudinal direction of the channel and between the opposite walls 112 of the first component 110. The thermoplastic second component 120 further comprises a locking portion 124 that is adjacent to an exterior 115 of the first component 110. The locking portion 124 comprises a ribbon lock 125 that extends adjacently over part of the exterior 115 of the first component 110, i.e. covering part of the exterior 115 of the first component 110. The ribbon lock 115 connects with the reinforcing portion 121 through the through hole 113 to at the base 111 and the further through hole 116 at the upstanding wall 112 of the first component 110. With the extension in the through holes 113, 116 and over the exterior 115, the second component 120 thus interlocks with the first component 110. The locking portion 124 further comprises a frame 126 that is moulded onto end edges 117 of the first component 110, see FIGS. 1c and 2a. The frame 126 envelopes the end edges 117 of the first component 110 at the upstanding walls 112 and at each free end of the first component. The frame 126 is adjacent to part of the exterior 115 of the first component 110. The ribbon lock 125 is connected to the frame 126 at the end edges 117 of the first component 110 at the upstanding walls 112, thus forming an integrally shaped second component 120 moulded onto the first component 110.

Figure 1B:
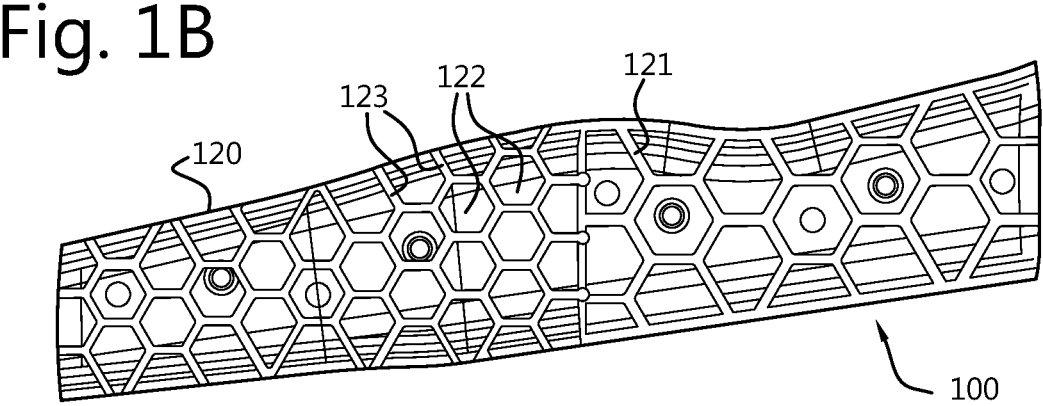
Figure 1C:
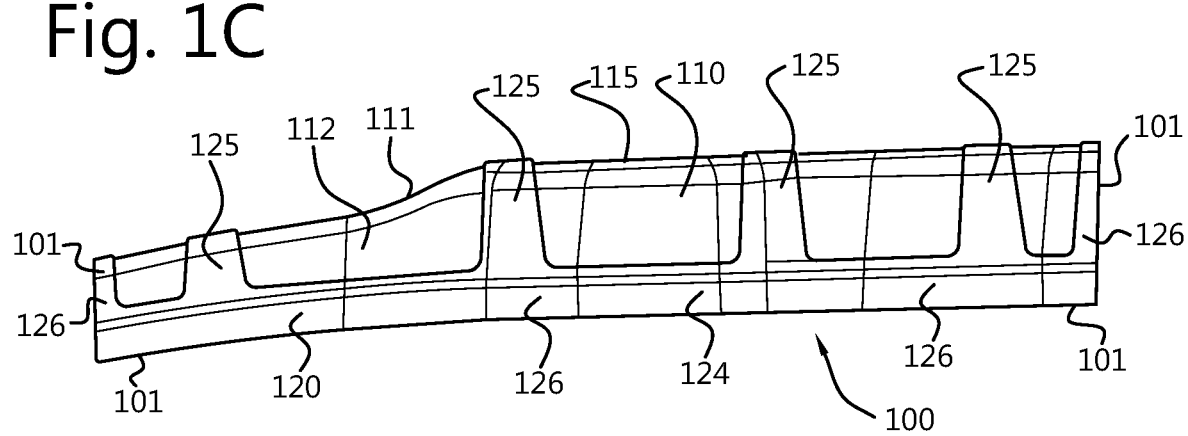
Figure 2B:
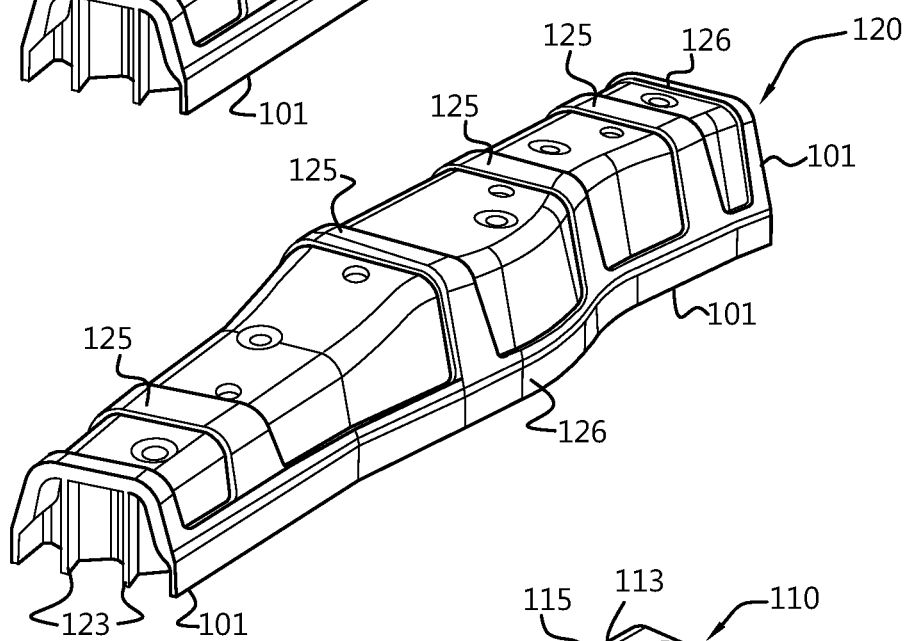
Figure 2C:
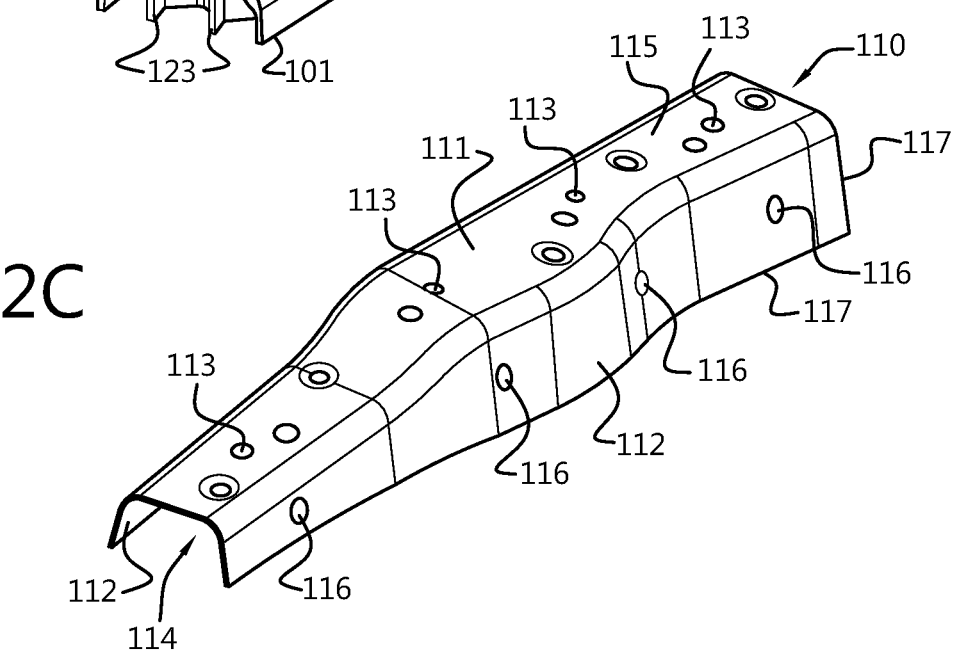

The reinforcing portion 121 is formed as an open alveolar structure that is shown to be shaped as honeycombs in FIG. 1b. The honeycomb structure forms channels 122 having an axial direction towards the base 111 of the first component 110. For the embodiments shown in the Figures, the channels 122 of the honeycomb structure are directed perpendicular to the longitudinal direction of the first component 110. Alternatively, the axial direction of the honeycomb channels may enclose an angle greater than 0 degrees and smaller than 90 degrees or greater than 90 degrees and smaller than 180 degrees with the longitudinal direction of the first component 110 or its base 111. FIG. 2b shows the walls 123 of the honeycomb structure to extend from the base 111 to an end edge 101 of the hybrid structure 100, thus extending over a height of the hybrid structure. Alternatively, the walls 123 of the honeycomb structure can extend from the base 111 to an end edge 117 of the first component 110.

Figure 3A:
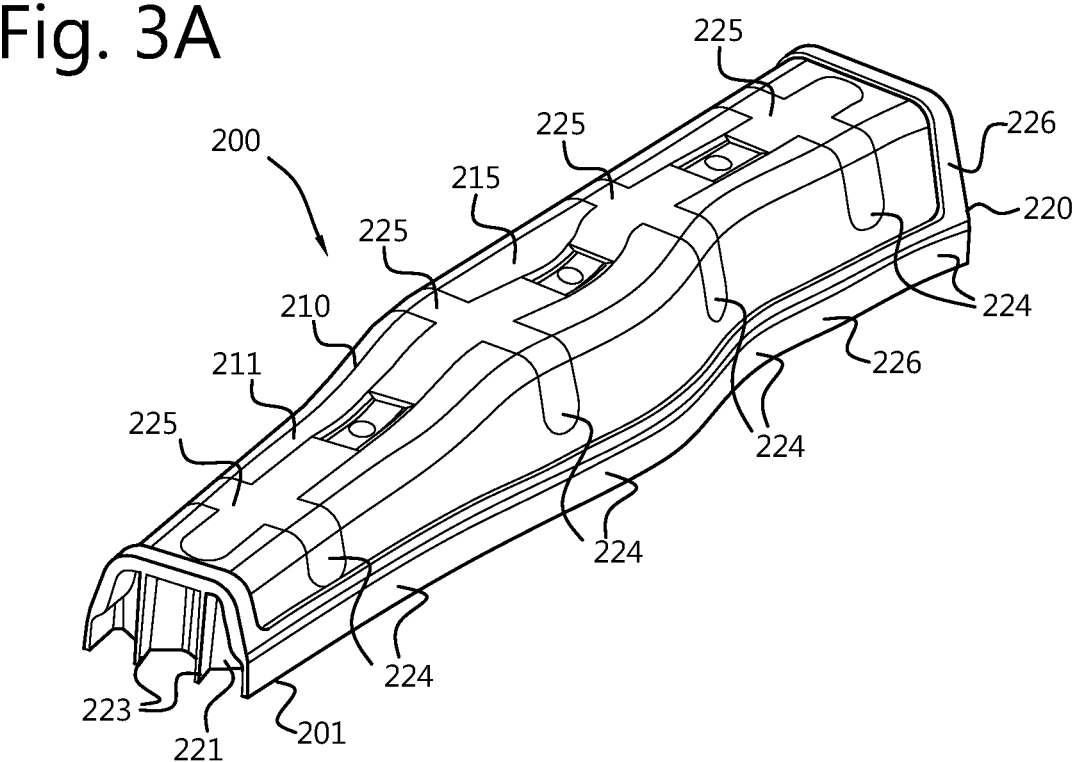
FIGS. 3a and b show a hybrid structure according to a second embodiment of the present invention.

FIGS. 3a and b show a hybrid structure 200 according to a second embodiment of the present invention. The hybrid structure 200 comprises a first component 210 and a thermoplastic second component 220. The first component has a base 211 and two opposite upstanding walls 212 extending from the base 211. The base 211 has a plurality of through holes (see FIG. 5). The upstanding walls 212 have a plurality of further through holes (see FIG. 5), which are aligned with the through holes of the base 211. The first component 210 has an interior 214 that is formed as a channel, as in FIG. 2c. At its exterior 215, the base 211 of the first component 210 is provided with a corrugation, formed as a deepening 218. At its interior 214, the base 211 of the first component 210 is provided with a raised portion (not shown), which is a negative shape of the deepening 218 at the exterior 215. The deepening 218 is provided with branches 218a that extend perpendicularly from the deepening 218 in the base 211 towards the end edges 217 of the upstanding walls 212 of the first component 210, see also FIG. 5. The deepening branches 218a have ends at a distance different from zero from the end edges 217, i.e. the branches 218a do not extend to the end edges 217 but end at the distance different from zero from the end edges 217. Alternatively, the branches do end at the end edges.

The second component 220 is made of a thermoplastic material moulded to the first component 210. The second component 220 has a reinforcing portion 221 that structurally reinforces the first component 220. The reinforcing portion 221 is located in the channel and extends in a longitudinal direction of the channel and between the opposite walls 212 of the first component 210. The thermoplastic second component 220 further comprises a locking portion 224 that is adjacent to an exterior 215 of the first component 210 and is provided in the deepening 218 and its branches 218a at the exterior 215 of the first component 210, forming an intermitting ribbon lock 225 in the deepening 218 and its branches 218a. The upper surface of the ribbon lock 225 is flush with the exterior of the first component 210. The ribbon lock 225 connects the locking portion 224 with the reinforcing portion 221 through the through hole at the base 211 and the further through hole at the upstanding wall 212 of the first component 210. With the extension in the through holes (not shown) and over the exterior 215, the second component 220 thus interlocks with the first component 210. The locking portion 224 further comprises a frame 226 that is moulded onto end edges of the first component 210, see FIG. 3a. The frame 226 envelopes the end edges 217 of the first component 210 at the upstanding walls 212 and at each free end of the first component. The frame 226 is adjacent to part of the exterior 215 of the first component 210. The ribbon lock 225 of this second embodiment of the hybrid structure does not connect to the frame 226.

Figure 3B:
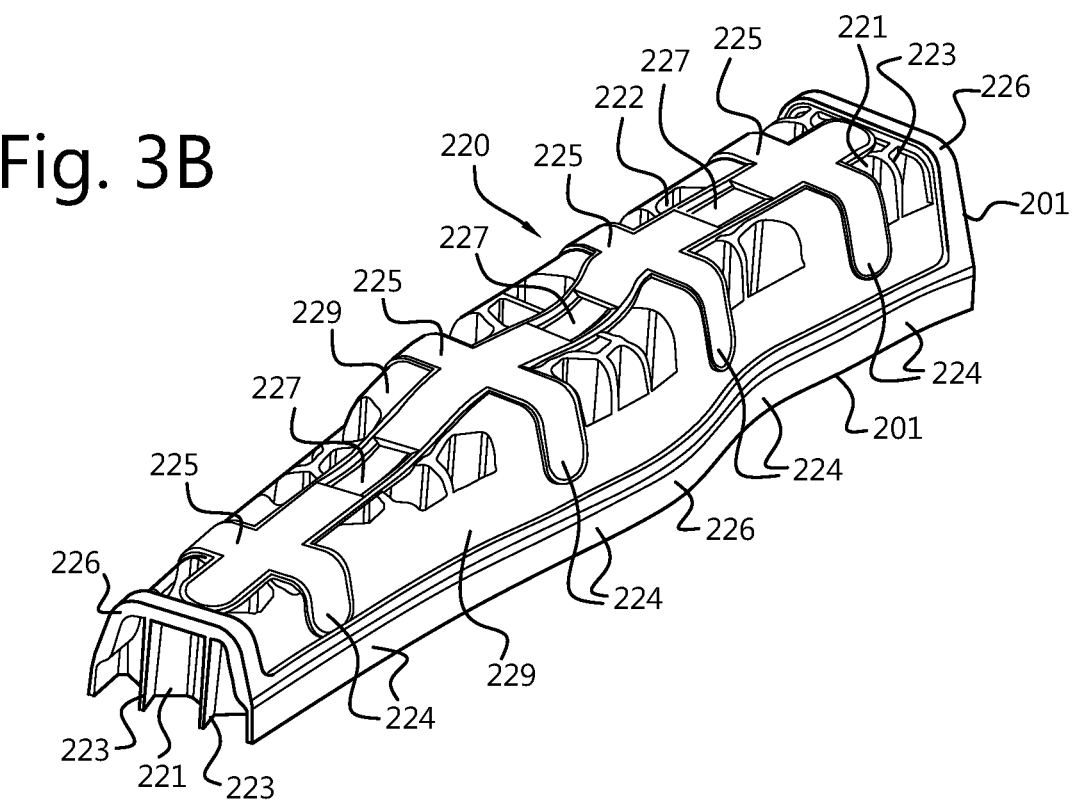

FIG. 3b shows the second component 220 of the hybrid structure 200, i.e. only the thermoplastic part of the hybrid structure 200. The second component 220 is formed to partially cover the base 211 at the interior of the first component 210 at adjacent portions 229 forming a base portion of the second component 220. The reinforcing portion 221 is formed as an open alveolar structure that is shown to be shaped as honeycombs in FIG. 3b. The honeycomb structure forms channels 222 having an axial direction A. In the hybrid structure, the axial direction A is directed towards the base 211 of the first component 210. For the embodiments shown in the Figures, the channels of the honeycomb structure are directed perpendicular to the longitudinal direction of the first component. FIG. 3b shows that the adjacent portions 229 include the walls 223 of the honeycomb structure that extend from the base 211 to an end edge 201 of the hybrid structure 200. Alternatively, the walls of the honeycomb structure can extend from the base to an end edge of the first component, or between the base (so not being adjacent) and the end edge, thus not fully extending over the height of the first component or the hybrid structure.

FIG. 3b shows a flow leader 227, which is shaped according to the raised portion (not shown in FIG. 3a), which is the negative shape of the deepening 218 shown in FIG. 3a. The flow leader 227 in FIG. 3b is shaped as a trough extending longitudinally and continuously over the second component 220, connecting at each end with the frame 226 at the free ends of the first component 210.

Figure 4A:
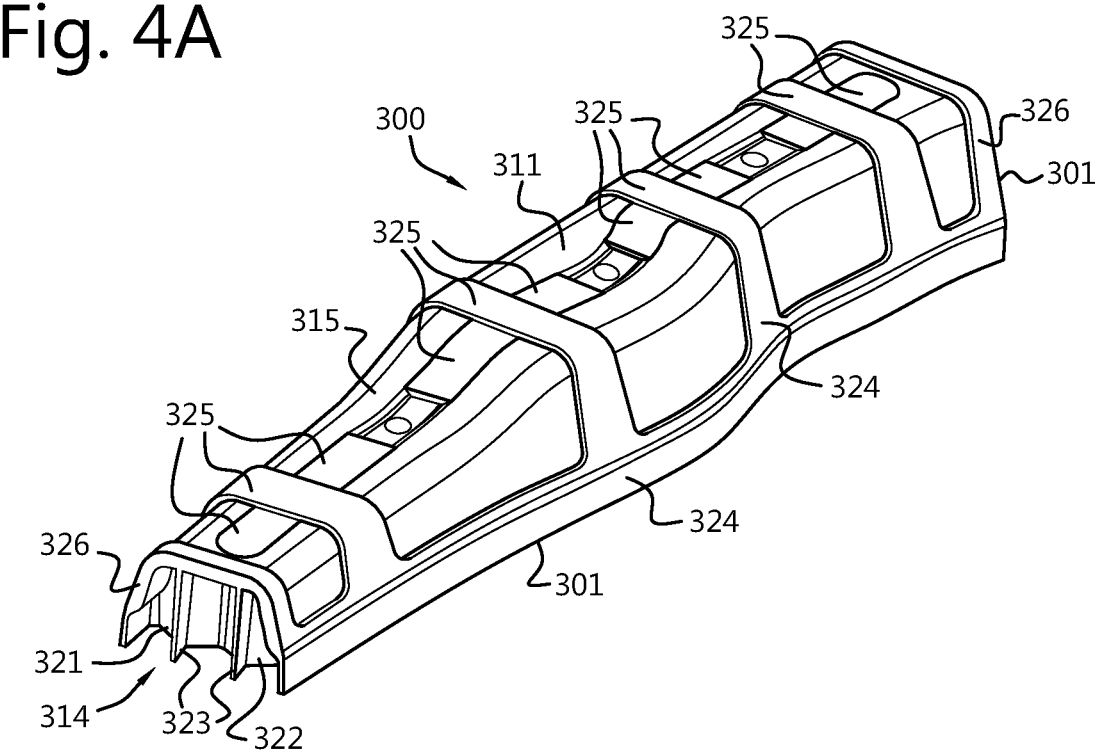
FIGS. 4a and b show a hybrid structure according to a third embodiment of the present invention.

FIGS. 4a and b show a hybrid structure 300 according to a third embodiment of the present invention. The hybrid structure 300 comprises a first component 310 and a thermoplastic second component 320. The first component has a base 311 and two opposite upstanding walls 312 extending from the base 311. The base 311 has a plurality of through holes (see FIG. 5). The upstanding walls 312 have a plurality of further through holes (see FIG. 5), which are aligned with the through holes of the base 311. The first component 310 has an interior 314 that is formed as a channel. At its exterior 315, the base 311 of the first component 310 is provided with a corrugation, formed as a deepening 318. At its interior 314, the base 311 of the first component 310 is provided with a raised portion (not shown), which is a negative shape of the deepening 318 at the exterior 315. The deepening 318 is provided with branches (318a) that extend perpendicularly from the deepening 318 in the base 311 towards the end edges 317 of the upstanding walls 312 of the first component 310 (see FIG. 5). The deepening branches 318a have ends at a distance different from zero from the end edges 317, i.e. the branches 318a do not extend to the end edges 317 but end at the distance different from zero from the end edges 317.

The second component 320 is made of a thermoplastic material moulded to the first component 310. The second component 320 has a reinforcing portion 321 that structurally reinforces the first component 320. The reinforcing portion 321 is located in the interior of the first component and extends in a longitudinal direction of the channel and between the opposite walls 312 of the first component 310. The thermoplastic second component 320 further comprises a locking portion 324 that is adjacent to an exterior 315 of the first component 310 and is provided in the deepening 318 and its branches at the exterior 315 of the first component 310, forming an intermitting ribbon lock 325 in the deepening 318. The ribbon lock 325 connects the locking portion 324 with the reinforcing portion 321 through the through hole at the base 311 and the further through hole at the upstanding wall 312 of the first component 310. With the extension in the through holes 313, 316 and over the exterior 315, the second component 320 thus interlocks with the first component 310. The locking portion 324 further comprises a frame 326 that is moulded onto end edges (see FIG. 5) of the first component 310. The ribbon lock 325 extends in a transverse direction in the branches, and further towards the frame 326. The ribbon lock 325 of this third embodiment of the hybrid structure thus connects to the frame 226. The ribbon lock 325 has a portion that is provided in the branches 318a of the deepening 318 at the upstanding walls 312, and a second portion that covers the exterior 315 of the first component 310 and connects to the frame 326.

Figure 4B:
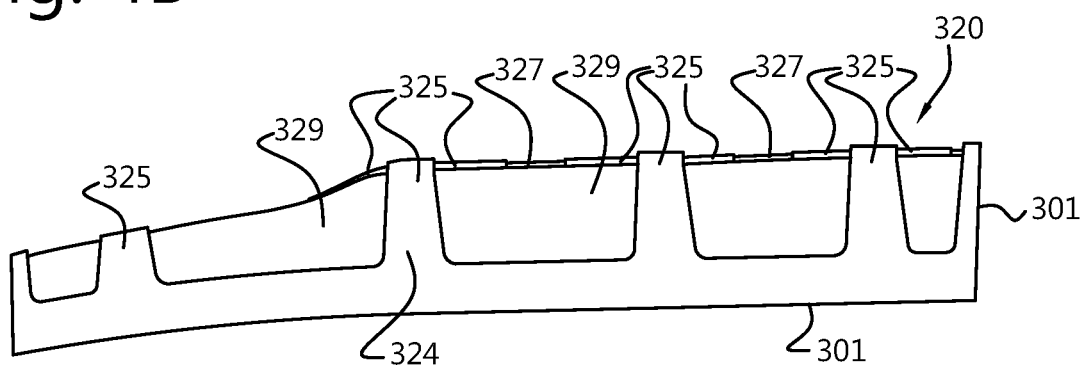

FIG. 4b shows the second component 320 of the hybrid structure 300, i.e. only the thermoplastic part of the hybrid structure 300 is shown in FIG. 4b. The second component 320 is formed to fully cover the base 311 of the first component 310 at adjacent portions 329 forming a base of the second component 320.

FIG. 5 shows a top view of the exterior of the first component 210, 310 of the hybrid structures of FIGS. 3 and 4. The first component 210, 310 has a base 211, 311 and two opposite upstanding walls 212, 312 extending from the base 211, 311. The base 211, 311 has a plurality of through holes 213, 313. The upstanding walls 212, 312 have a plurality of further through holes 216, 316, which are aligned with the through holes 213, 313 of the base 211, 311. At its exterior

215, 315, the base 211, 311 of the first component 210, 310 is provided with a corrugation, formed as a deepening 218, 318. At its interior, the base of the first component is provided with a raised portion (not shown), which is a negative shape of the deepening 218, 318 at the exterior 215, 315. The deepening 218, 318 is provided with branches 218a, 318a that extend perpendicularly from the deepening 218, 318 in the base 211, 311 towards the end edges 217, 317 of the upstanding walls 212, 312 of the first component 210, 310. The deepening branches 218a, 318a end at a distance different from zero from the end edges 217, 317, i.e. the branches 218a, 318a do not extend to the end edges 217, 317 but end at the distance different from zero from the end edges 217, 317.

FIG. 5 further shows that at each free end of the intermitting ribbon lock 225, 325 in the deepening, a through hole 213, 313, 216, 316 is provided, such that each end of the ribbon lock 225, 325 connects to the reinforcing portion 221, 321.

FIG. 6 shows a bottom view of the interior 214, 314 of the hybrid structure 200, 300 of FIGS. 3 and 4. The reinforcing portion 221, 321 of the second component 220, 320 is formed within the interior 214, 314 of the first component 210, 310. The reinforcing portion 221, 321 has an open alveolar structure that is shown to be shaped as honeycombs in FIG. 6. The honeycomb structure forms channels 222, 322 having an axial direction A, see also FIG. 3b. In the hybrid structure 200, 300, the axial direction A is directed towards the base 211, 311 of the first component 210, 310. FIG. 6 shows a flow leader 227, 327, which is shaped according to the raised portion 219, 319, which is the negative shape of the deepening 218, 318 shown in FIG. 5. The flow leader 227 in FIG. 6 is shaped as a trough extending longitudinally and continuously over the second component 220, 320, connecting at each end with the frame 226, 326 at the free ends of the first component 210, 310.

Figure 7A:
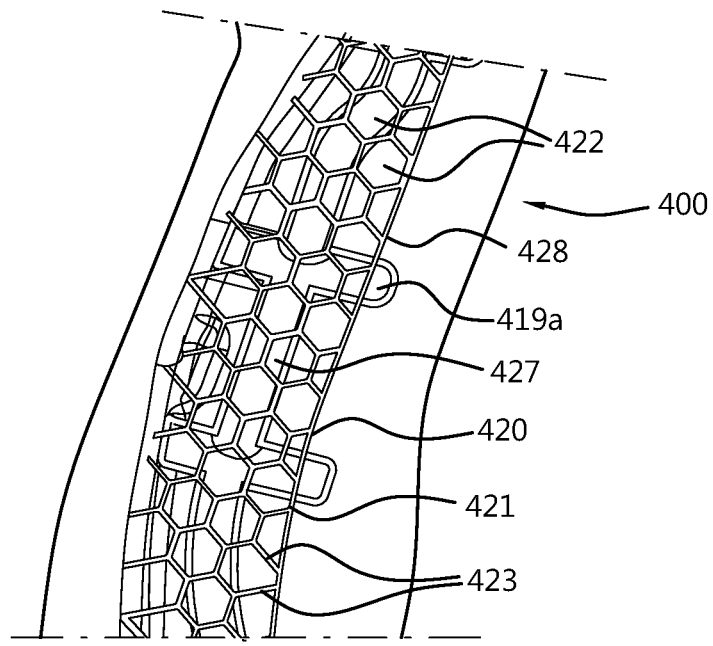
FIGS. 7a-c show a hybrid structure according to a fourth embodiment of the present invention.
Figure 7B:
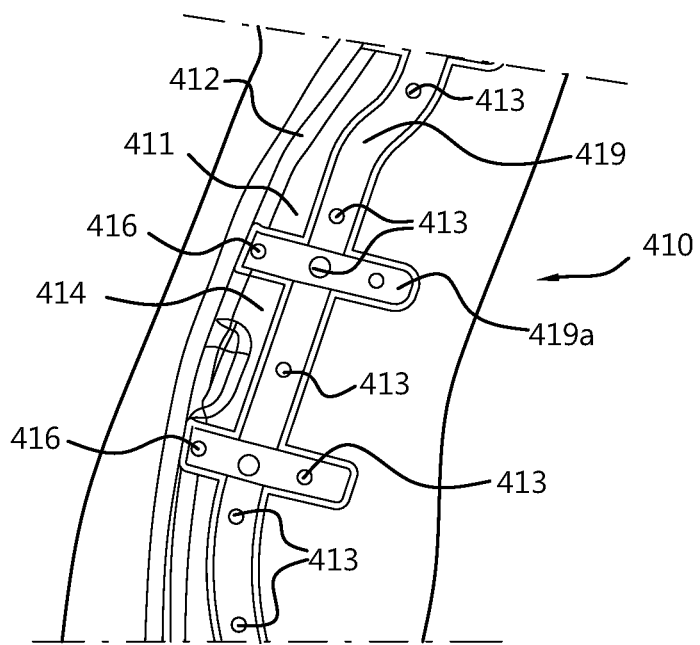
Figure 7C:
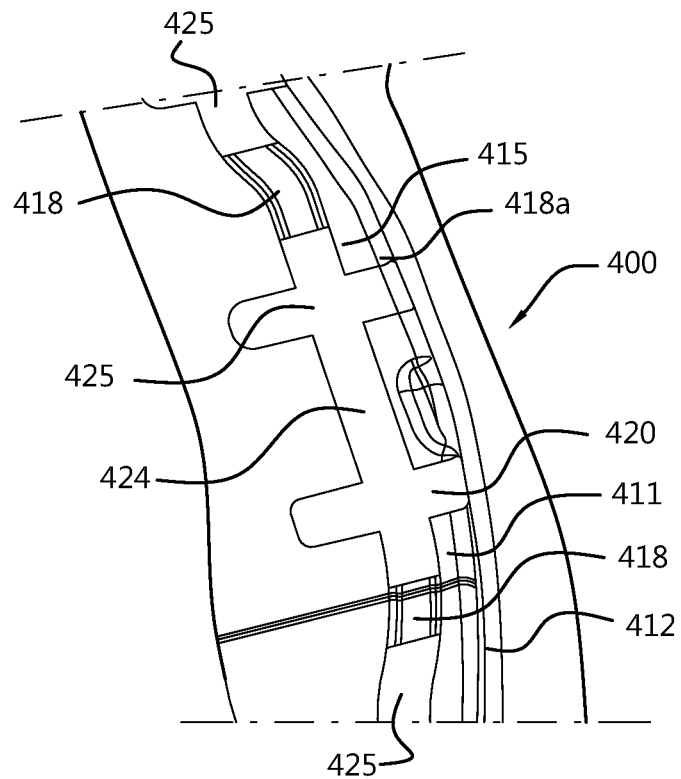

FIGS. 7a-c show a hybrid structure 400 according to a fourth embodiment of the present invention. The hybrid structure 400 comprises a first component 410 and a thermoplastic second component 420 that extends from the upstanding wall 412 and the base 411 in the longitudinal direction of the first component 410. The first and the second component thus extend in a parallel fashion. The second component 420 comprises a reinforcing portion 421 and a further upstanding wall 428 that delimits the second component 420, and the reinforcing portion 421 in a transverse direction. The reinforcing portion 421 has a honeycomb shaped alveolar structure with channels 422 having an axial direction A perpendicular to the base 411 of the first component. The channels 422 are delimited by cell walls 423.

Along the base 411 of the first component runs a raised portion 419 in a longitudinal direction, see FIG. 7b. The raised portion 419 has perpendicular branches 419a. Within the raised portion 419 and its branches 419a, a plurality of through holes 413, 416 are provided, each at a distance from another through hole. FIG. 7a shows that the longitudinal extending raised portion 419 is covered with the thermoplastic material of the second component 420.

FIG. 7c shows that at an exterior 415 of the first component 410, a deepening 418 is provided, having perpendicular branches 418a. The deepening 418 and the perpendicular deepening branches 418a are the negative shapes of the raised portion 419 and the raised portion branches 419a at the interior 414 of the first component 410, or vice versa. The through holes 413, 416 extend from the interior 414 to the exterior 416 of the first component 410, or vice versa. The deepening 418 and its branches contain the intermitting and branched ribbon lock 425 of the locking portion 424 to lock the second component 420 with the first component 410 to form the hybrid structure 400.

To form the hybrid structure 100, 200, 300, 400 the first component 110, 210, 310, 410 is pre-formed with a base 111, 211, 311, 411 and one or two upstanding walls 112, 212, 312, 412. The first component is then inserted into a cavity (not shown) of an injection moulding tooling or cast or mold (not shown) that is formed to receive the first component 110, 210, 310, 410 and to form part of the second component 120, 220, 320, 420, specifically the locking portion 124, 224, 324, 424 with or without at least part of the frame portion 124, 224, 324, 424. The injection moulding tooling is then closed by inserting a core into the interior 114, 214, 314, 414 of the first component 110, 210, 310, 410. The core is shaped to form the reinforcing portion 121, 221, 321, 421, in particular the alveolar or honeycomb structure of the reinforcing portion and possibly at least part of the frame 116, 216, 316. After closing the mould or cast, flowable or melted thermoplastic material is injected into the tooling through injection points. The raised portion 219, 319, 419 shown in FIGS. 3 to 7 is used as a flow leader during the injection of the flowable thermoplastic material, such that the material can more easily flow into the core for forming the honeycomb cells. Upon cooling of the thermoplastic material, the second component 120, 220, 320, 420 solidifies to encapsulate at the first component 110, 210, 310, 410 at least partially, thus interlocking each other, and the hybrid structure 100, 200, 300, 400 is formed.

When the first component 110, 210, 310, 410 is made of a composite material, the pre-forming of the first component 110, 210, 310, 410 could be performed simultaneously with the injection moulding of the second component 120, 220, 320, 420 in a single machine, which is known as an integrated manufacturing cell.

Figure 8:
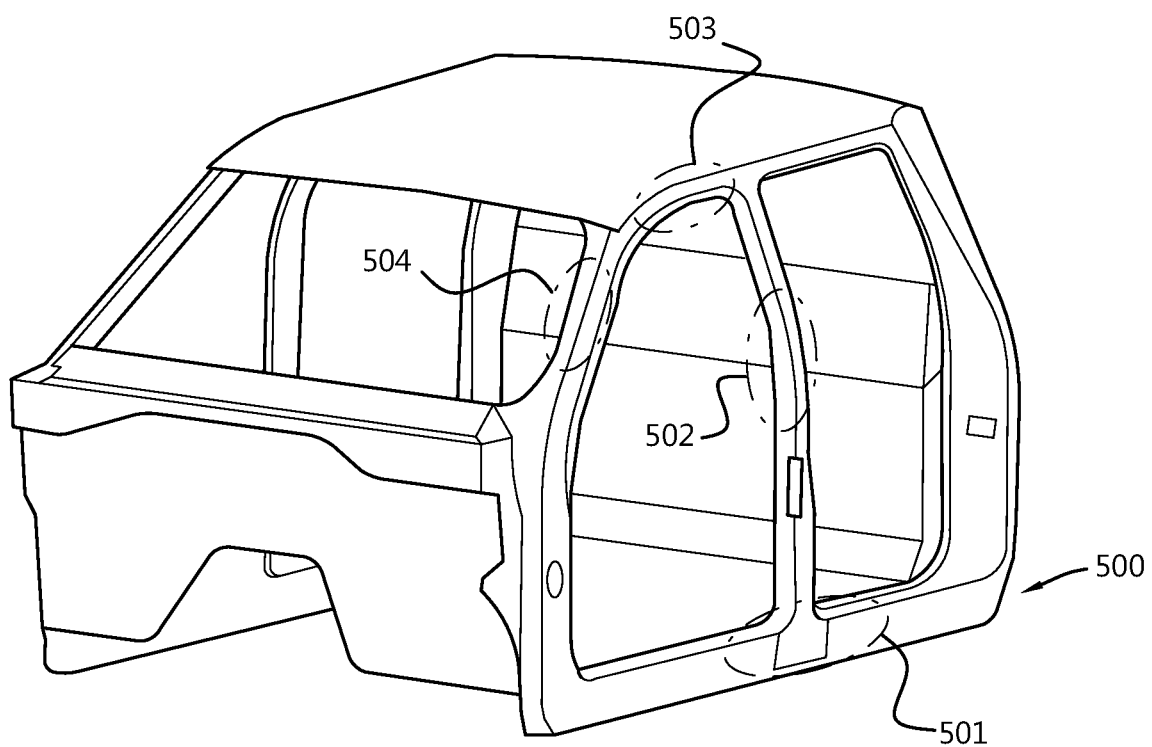
FIG. 8 show part of a structural body frame of a car.

FIG. 8 show part of a structural body frame 500 of a vehicle, more specifically of a car. The hybrid structure can be located in various areas of the vehicle, such as in the body in white (BIW, also known as the body in black), for instance in the A-Pillar 504, B-Pillar 502, roof rail 503, and floor rocker 501 and so forth, as well as combinations comprising at least one of the foregoing.

The structural body frame comprises a number of hollow vehicle component, such as the A-Pillar 504, B-Pillar 502, roof rail 503, and floor rocker 501 and so forth that are welded together, or otherwise joined. The hybrid structure 100, 200, 300, 400 can either be used as a reinforcement of such a hollow vehicle component, that is inserted in the space shaped by the hollow component, or as a structural member of the body frame. In the latter case, the first component 110, 210, 310, 410 of the hybrid structure 100, 200, 300, 400 may form the hollow vehicle component, such as the A-Pillar 504, B-Pillar 502, roof rail 503, and floor rocker 501 and so forth, and the second component 120, 220, 320, 420 is injection moulded into this hollow vehicle component for reinforcement.

Set forth below are some examples of a hybrid structure.

Aspect 1: A hybrid structure, comprising: a first component having a base and an upstanding wall extending from the base (preferably at least two opposite upstanding walls extending from the base, preferably extending from the base in the same direction), the first component having an interior enclosed between the upstanding wall and the base, and a thermoplastic second component moulded to the first component, the second component comprising a reinforcing portion for structurally reinforcing the first component, the reinforcing portion extending in a longitudinal direction of the first component and located in the interior of the first component, the thermoplastic second component further comprising a locking portion that extends adjacently over at least part of an exterior of the first component, wherein the reinforcing portion and the locking portion are integrally formed, thus interlocking the first component in the thermoplastic second component.

Aspect 2: A hybrid structure, wherein the first component comprises a through hole, and the locking portion connects to the reinforcing portion through the through hole.

Aspect 3: The hybrid structure according to any of the preceding aspects, wherein the first component has at least two opposite upstanding walls having end edges and the reinforcing portion extends from one end edge to an opposite end edge of the first component, and wherein the locking portion extends over the exterior of the first component from the one end edge to the opposite end edge of the first component, thus connecting with the reinforcing portion at the end edges of the first component.

Aspect 4: The hybrid structure according to any of the preceding aspects, wherein the first component has at least two opposite upstanding walls having end edges, wherein the locking portion comprises a frame moulded on the end edges of the first component partially covering the exterior of the first component, thereby surrounding and enveloping the end edges of the first component.

Aspect 5: The hybrid structure according to any of the preceding aspects, wherein the reinforcing portion comprises an alveolar structure comprising channels directed transverse to the base of the first component.

Aspect 6: The hybrid structure according to any of the preceding aspects, wherein at the exterior of the first component, the base comprises a corrugation extending in the longitudinal direction of the first component, wherein the locking portion adjacent to the exterior of the first component extends with the corrugation in the longitudinal direction.

Aspect 7: The hybrid structure according to any of the preceding aspects, wherein at the interior of the first component the base comprises a corrugation and wherein the second component extends with the corrugation in the longitudinal direction.

Aspect 8: The hybrid structure according to any of the preceding aspects, wherein the first component is a composite component, a metallic component, or a composite/metal hybrid component.

Aspect 9: The hybrid structure according to Aspect 8, wherein the hybrid structure is a reinforcing member for a body frame of a vehicle, and the reinforcing member is connectable to the body frame by means of at least one of a mechanical fastener, a weld and an adhesive.

Aspect 10: A vehicle comprising the hybrid structure according to any of the preceding aspects.

Aspect 11: The vehicle according to Aspect 10, further comprising a structural body frame, wherein the hybrid structure forms part of the structural body frame, preferably forming at least part of one of an A-pillar, a B-pillar, a C-pillar, a D-pillar region, and a roof pillar of a body-in-white frame of the vehicle.

Aspect 12: A method for manufacturing the hybrid structure according to any of the preceding aspects, the method comprising: providing the first component; providing the thermoplastic second component to the first component by moulding the reinforcing portion in the interior of the first component, and moulding the locking portion onto the exterior of the first component to cover at least part of the exterior, wherein the reinforcing portion and the locking portion are integrally moulded, thus interlocking the second component and the first component.

Aspect 13: The method according to aspect 12, wherein the base and/or the upstanding wall of the first component has a through hole, and the method further comprises moulding the second component through the through hole to form the reinforcing portion or the locking portion.

Aspect 14: The method according to Aspect 12 or 13, wherein the first component has at least two opposite upstanding walls having end edges, the method further comprising moulding the reinforcing portion in the interior from one end edge to an opposite end edge of the first component, and moulding the locking portion over the exterior of the first component from the one end edge to the opposite end edge of the first component, thus connecting the locking portion with the reinforcing portion at the end edges of the first component.

Aspect 15: The method according to any of Aspects 12-14, wherein the first component has at least two opposite upstanding walls having end edges, the method further comprising moulding a frame on the end edges of the first component to partially cover the exterior of the first component, thereby surrounding and enveloping the end edges of the first component.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless specified otherwise. The suffix "(s)" as used herein is intended to include both the singular and the plural of the term that it modifies. Reference throughout the specification to "an embodiment" means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. "At least one of A, B, or C", is equivalent to "A, B, C, and combinations comprising at least one of the foregoing". That is, one or more members of the group are present. For example, "oval, square, rectangular, triangular, diamond, pentagonal, hexagonal, heptagonal, and octagonal geometries, as well as combinations comprising at least one of the foregoing geometries" is equivalent to "at least one of oval, square, rectangular, triangular, diamond, pentagonal, hexagonal, heptagonal, or octagonal geometries"

"Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference. The present application claims priority to U.S. Provisional Application Ser. No. 62/483,560, filed Apr. 10, 2017, which is incorporated herein in its entirety.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

LIST OF PARTS 100, 200, 300, 400. Hybrid structure
101, 201, 301. End edge of hybrid structure
110, 210, 310, 410. First component
111, 211, 311, 411. Base
112, 212, 312, 412. Upstanding wall
113, 213, 313, 413. Through hole
114, 214, 314, 414. Interior of first component/channel
115, 215, 315, 415. Exterior of first component
116, 216, 316. Further through hole
117, 217, 317. End edge of first component
218, 318, 418. Deepening
218a, 318a, 418a. Branches
219, 319, 419. Raised portion
219a, 319a, 419a. Branches
120, 220, 320, 420. Second component
121, 221, 321, 421. Reinforcing portion
122, 222, 322, 422. Channels of honeycomb structure
123, 223, 323, 423. Cell wall of reinforcing portion
124, 224, 324, 424. Locking portion
125, 225, 325, 425. Ribbon lock
126, 226, 326. Frame
227, 327, 427. Flow leader
428. Upstanding wall
229, 329. Adjacent portion/base of second component
500. Body frame of vehicle
501. Floor rocker
502. B-Pillar
503. Roof rail
504. A-Pillar

The invention claimed is:

1. A hybrid structure, comprising:
a first component having a base, a first extending from the base, and a second upstanding wall extending from the base, the second upstanding wall being opposite the first upstanding wall, the first component having an interior enclosed between the first upstanding wall, the second upstanding wall, and the base, and
a thermoplastic second component moulded to the first component, the thermoplastic second component comprising a reinforcing portion for structurally reinforcing the first component, the reinforcing portion extending in a longitudinal direction of the first component and located in the interior of the first component,
the thermoplastic second component further comprising a locking portion that extends adjacently over at least part of an exterior of the first component, wherein the reinforcing portion and the locking portion are integrally formed, thus interlocking the first component in the thermoplastic second component,
wherein the locking portion comprises a plurality of ribbon locks that extend adjacently over an exterior surface of the base, an exterior surface of the first upstanding wall, and an exterior surface of the second upstanding wall, and
wherein the ribbon locks have a first free end on the first upstanding wall and a second free end on the second upstanding wall.

2. The hybrid structure according to claim 1, wherein the reinforcing portion and the locking portion of the thermoplastic second component are integrally formed such that the thermoplastic second component is a unitary component, thus interlocking the first component in the thermoplastic second component.

3. The hybrid structure according to claim 2, wherein the reinforcing portion and the locking portion of the thermoplastic second component are integrally formed such that the locking portion extends over an edge of the first component to integrally connect the locking portion to the reinforcing portion.

4. The hybrid structure according to claim 2, wherein the reinforcing portion and the locking portion of the thermoplastic second component are integrally formed such that the locking portion extends through a through hole in the first component to integrally connect the locking portion to the reinforcing portion.

5. The hybrid structure according to claim 1, wherein the first and second upstanding walls have end edges, wherein the locking portion comprises a frame moulded on the end edges of the first component partially covering the exterior of the first component, thereby surrounding and enveloping the end edges of the first component.

6. The hybrid structure according to claim 5, wherein the frame of the locking portion is integrally formed with the reinforcing portion.

7. The hybrid structure according to claim 6, wherein the reinforcing portion and the frame of the locking portion are a unitary component.

8. The hybrid structure according to claim 1, wherein the reinforcing portion and the locking portion are a unitary component.

9. The hybrid structure according to claim 1, wherein reinforcing portion comprises an alveolar structure comprising channels directed transverse to the base of the first component.

10. The hybrid structure according to claim 1, wherein the first component is a composite component, a metallic component, or a composite/metal hybrid component.

11. The hybrid structure according to claim 1, wherein the reinforcing portion and a frame of the locking portion of the thermoplastic second component are integrally formed to integrally connect the locking portion to the reinforcing portion.

12. The hybrid structure according to claim 1, wherein the reinforcing portion and a frame of the locking portion of the thermoplastic second component are integrally formed to integrally connect the locking portion to the reinforcing portion.

13. A vehicle comprising the hybrid structure according to claim 1.

14. The vehicle according to claim 13, further comprising a structural body frame, wherein the hybrid structure forms part of the structural body frame.

15. A method for manufacturing a hybrid structure, the method comprising:
- providing a first component having a base, a first upstanding wall extending from the base, and a second upstanding wall extending from the base, the second upstanding wall being opposite the first upstanding wall, the first component having an interior enclosed between the first upstanding wall, second upstanding wall, and the base; and
- providing a thermoplastic second component to the first component by moulding a reinforcing portion of the thermoplastic second component for structurally reinforcing the first component in the interior of the first component, the reinforcing portion extending in a longitudinal direction of the first component and located in the interior of the first component, and moulding a locking portion of the thermoplastic second component that extends adjacently over at least part of an exterior of the first component onto the exterior of the first component to cover at least part of the exterior, wherein the reinforcing portion and the locking portion are integrally moulded, thus interlocking the first component in the thermoplastic second component,
- wherein the locking portion comprises a plurality of ribbon locks that extend adjacently over an exterior surface of the base, an exterior surface of the first upstanding wall, and an exterior surface of the second upstanding wall, and
- wherein the ribbon locks have a first free end on the first upstanding wall and a second free end on the second upstanding wall.

16. The hybrid structure according to claim 1, wherein upper surfaces of the ribbon locks are flush with the exterior of the first component.

17. The method according to claim 15, wherein upper surfaces of the ribbon locks are flush with the exterior of the first component.

18. A method for manufacturing a hybrid structure, the method comprising:
- providing a first component having a base and an upstanding wall extending from the base, the first component having an interior enclosed between the upstanding wall and the base;
- flowing thermoplastic material within the interior of the first component to form a reinforcing portion for structurally reinforcing the first component and over an exterior of the first component to form a locking portion, wherein the thermoplastic material flows between the interior of the first component and the exterior of the first component through a through hole in the first component, wherein
  - the reinforcing portion extends in a longitudinal direction of the first component, the locking portion extends adjacently over at least part of the exterior of the first component, and the reinforcing portion and the locking portion are integrally formed, thus interlocking the first component in the thermoplastic second component,
  - the locking portion comprises a plurality of ribbon locks that extend adjacently over an exterior surface of the base and an exterior surface of the upstanding wall,
  - the reinforcing portion and the locking portion of the thermoplastic second component are integrally formed such that the thermoplastic second component is a unitary component, thus interlocking the first component in the thermoplastic second component,
  - the reinforcing portion and the locking portion of the thermoplastic second component are integrally formed such that the locking portion extends through the through hole in the first component to integrally connect the locking portion to the reinforcing portion, and
  - upper surfaces of the ribbon locks are flush with the exterior of the first component; and
- solidifying the thermoplastic material such that material in the through hole connects the reinforcing portion at the interior of the first component and the locking portion at the exterior of the first component.

19. A hybrid structure manufacture according to the method of claim 18.

* * * * *